May 7, 1940.   J. H. H. VOSS   2,199,452
COMPRESSOR VALVE ASSEMBLY
Filed April 7, 1937
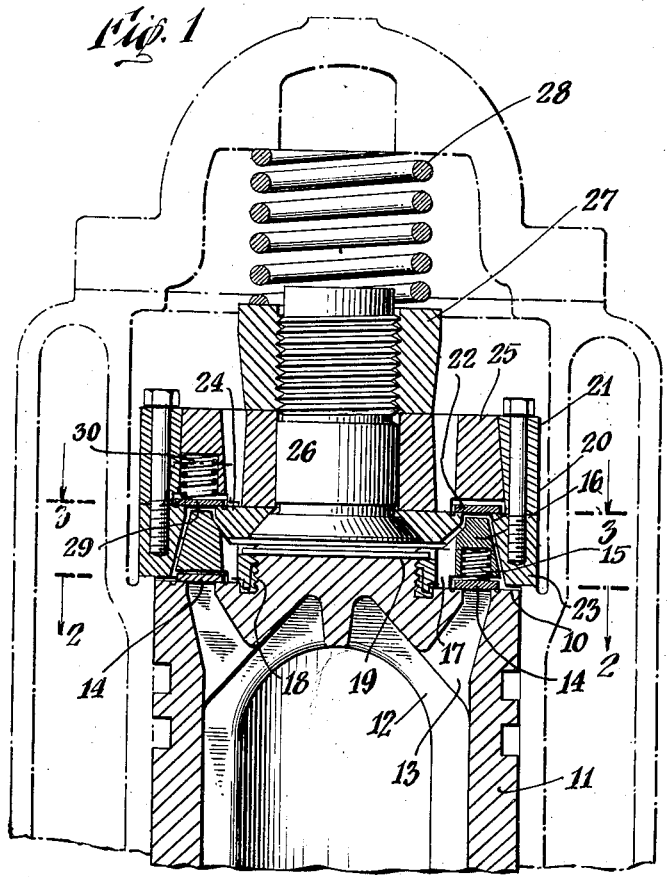
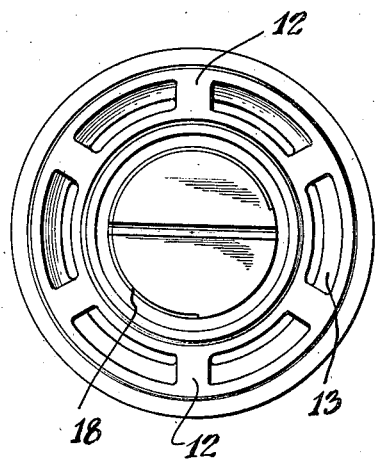
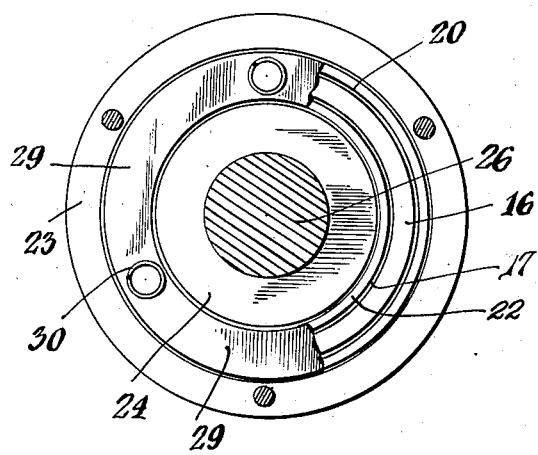
INVENTOR
Johann H. H. Voss
BY
ATTORNEY Patented May 7, 1940

2,199,452

UNITED STATES PATENT OFFICE 2,199,452

COMPRESSOR VALVE ASSEMBLY

Johann H. H. Voss, White Plains, N. Y.

Application April 7, 1937, Serial No. 135,474

1 Claim. (Cl. 230—221)

This invention relates to improvements in automatic ring plate valves, particularly such for use in the well known vertical single acting compressors having piston inlet valves and the discharge valves located in, or combined with a so-called safety head.

In compressors of this type which are commonly known as "non-clearance" compressors, the standard valve design is that of the flat bottom heavy poppet valve which operates fairly with high valve lift for speeds up to 150 R. P. M. for small, and up to 75 R. P. M. for large machines.

For speeds of 300 R. P. M., and higher, light weight plate valves are used of various design and perfection. With some of these valves the clearance volume of the compressors becomes rather large (above 6%) due to the pockets in the valve guard of the suction valves and the valve seats of the discharge valves. In other designs, large and comparatively heavy discs are used for the discharge valve giving a reduction in the clearance volume but with resulting noisy and uncertain operation and reduced operating efficiency.

The primary object of my invention is to provide a valve assembly to which the defects described above are not attached or inherent, and which is particularly well adapted for use in vertical single acting ammonia, air or gas compressors.

To this end I provide a valve assembly in which the round valve guard of the suction valve is shaped in such a way that it reaches nearly to the bottom of the discharge valve plate. The contour of the suction valve guard is streamlined for easy gas flow and in shape approximates the form of the corresponding discharge valve seat which forms part of the safety head. I preferably use valve ring plates of large diameter (from 80 to 90% of the cylinder bore) and use comparatively low valve lifts to obtain large valve area and noiseless and efficient operation at high speed.

Another object of my invention is the provision of a valve guard for the suction valve which is screwed onto a projecting screw thread of the piston, while its upper part is so shaped that it comes very near under the valve plate of the discharge valve.

A further object of my invention is the provision of a discharge valve guard to which are attached two separate rings which form the valve seat for the discharge valve, while the discharge valve plate is seated on the outside ring on its outer periphery and on a separate inside ring on its inner periphery.

A still further object of my invention is the provision of a valve guard to which the separate outside ring of the discharge valve seat is attached by means of bolts while the inside ring is attached to the discharge valve guard by means of a large center bolt and nut, and the dimensioning of these parts conveniently in such way that their assembly forms a safety head which is held in position by a spring. The entire assembly is inserted on the center bore above the compressor bore, while the gas passages in the valve guard give easy access and exit through large areas so that the operation of the machine becomes very economical, and it will be clear that the same design and valve construction may be used for two- and three-ring valves in larger compressors.

These and other objects and advantages of my invention will become more fully apparent as the description thereof proceeds, and will then be specifically defined in the appended claim.

One illustrative embodiment of my invention is represented by way of example in the accompanying drawing, wherein:

Fig. 1 is a central sectional elevation showing the upper part of the piston with the suction valve plate and port and the discharge valve incorporated with the safety head and co-operating parts.

Fig. 2 is a top view of the suction valve seat seen on line 2—2 of Figure 1.

Fig. 3 is a top view of the discharge valve seat seen on the line 3—3 of Figure 1.

As illustrated, the suction or piston inlet valve consists of the valve seat 10 which is cast with the piston 11 and connected with its central portion by a series of ribs 12, placed radially across the circular port slot 13. The suction valve ring plate 14 rests on the valve seat 10 where it is held in closed position by means of springs 15 which are located in the guard 16. This guard 16 has adjacent to the inner circumference of the ring plate 14 flow slots 17 and is securely and centrally fastened to the piston by means of a large screw thread 18 and a wire lock 19 at the top of the screw thread 18.

The upper part of the guard 16 is conical on its circumference, the center part is bowl-shaped and the top rim is flat, giving a contour which fits with appropriate clearance into the flow slot 20 of the discharge valve. The valve seat 22 of the discharge valve is made up of the outer ring 23 and the inner ring 24. The outer ring 23 and the inner ring 24 are fastened to the discharge valve guard 25, the outer ring by means of machine screws near its circumference and the inner ring by means of a large center bolt 26. The nut 27 is conveniently given such dimensions that the hold-down spring 28 for the discharge valve assembly is placed on top of this nut. When assembled in this manner, the opposing surfaces of the valve guard 25, the outer ring 23 and the inner ring 24 form a true, flat surface for the valve seat 22, so that the discharge valve ring plate 29 comes to rest evenly upon its inner and outer circumferences.

The discharge valve ring plate 29 is held in its closed position by means of springs 30 which are located in drilled recesses in the valve guard 25. The valve guard 25 has openings 25' on its inner and outer circumferences for the compressed gas to flow through the valves as shown in the drawing.

All the parts of the valve assembly can be produced by simple machining processes as drilling, turning and grinding which makes this valve assembly especially valuable for replacing older valve designs in which heavy poppet valves are used in compressors now in operation for many years. For instance by installing the new valve assembly in a compressor now running at 150 R. P. M., it is possible to increase the speed to 250 R. P. M., which gives a considerable increase in capacity.

In the operation of my invention the gas to be compressed reaches the suction valve through the trunk piston and on the down stroke of the piston the suction valve opens and rests against the lower surface of the suction valve guard with the gas streaming into the cylinder cavity through both sides of the suction valve plate. On reversal of the piston stroke, that is, during its upward movement, the gas is compressed to slightly above the condenser or receiver pressure when the discharge valve opens to give passage to the compressed gas from the cylinder cavity. At the end of the compression stroke there is but very small clearance between the contour of the discharge valve seat and that of the suction valve guard so that the actual pumping capacity of the compressor is much increased over that obtained in compressors with large clearance volume as will be understood by those skilled in the arts.

It will be understood that I have described and shown the preferred form of my invention only as one example of the many possible ways to practically construct the same and that I may make such changes in its general arrangement and in the construction of its minor details as come within the scope of the appended claim without departure from the spirit of my invention and the principles involved.

Having thus described my invention, what I claim as new, and desire to secure by Letters Patent is:

In a valve assembly as described including an inlet valve and a discharge valve, a piston having a seat for the inlet valve, a series of ribs placed radially across a circular port and connecting said seat with the central portion of the piston, a ring plate resting on said seat, a guard for said inlet valve in which springs are embedded to hold said ring plate on said seat, said guard having an upper, conical circumference, a bowl-shaped center part, a flat top rim and flow slots adjacent to the inner circumference of said ring plate, said guard securely and centrally fastened to said piston by a screw and wire lock, said discharge valve having a flow slot into which fits with an appropriate clearance the said bowl-shaped center part of the inlet-valve guard and its flat top rim, a guard for said discharge valve having a recess in which springs are located, and having openings on its inner and outer circumference for the flow of the compressed gas through said slots, a seat for said discharge valve composed of an outer ring screwed to said guard, and an inner ring secured to said guard by the intermediary of a large center bolt, a nut on said bolt and a spring on top of said nut to hold the parts assembled so that the opposing surfaces of the discharge valve guard, the outer ring and the inner ring form a true, flat surface for the valve seat and the discharge valve ring plate rests evenly on its inner and outer circumferences, said spring in the recess of the discharge valve guard holding said discharge valve ring plate in closed position.

JOHANN H. H. VOSS.